(12) United States Patent
Sun et al.

(10) Patent No.: US 12,494,722 B2
(45) Date of Patent: Dec. 9, 2025

(54) MAGNETIC RESONANCE SYSTEM AND POWER SUPPLY DEVICE FOR PULSED LOAD OF MAGNETIC RESONANCE SYSTEM

(71) Applicant: GE Precision Healthcare LLC, Waukesha, WI (US)

(72) Inventors: Haiyuan Sun, Beijing (CN); Hong Gu, Beijing (CN)

(73) Assignee: GE Precision Healthcare LLC, Waukesha, WI (US)

( * ) Notice: Subject to any disclaimer, the term of this patent is extended or adjusted under 35 U.S.C. 154(b) by 266 days.

(21) Appl. No.: 18/453,550

(22) Filed: Aug. 22, 2023

(65) Prior Publication Data
US 2024/0069128 A1    Feb. 29, 2024

(30) Foreign Application Priority Data
Aug. 31, 2022 (CN) .......................... 202211052977.9

(51) Int. Cl.
| | |
|---|---|
| *H02M 11/00* | (2006.01) |
| *G01R 33/36* | (2006.01) |
| *G01R 33/38* | (2006.01) |
| *G01R 33/385* | (2006.01) |
| *H02M 3/335* | (2006.01) |
| *H02M 1/00* | (2006.01) |

(52) U.S. Cl.
CPC ......... *H02M 11/00* (2013.01); *G01R 33/3614* (2013.01); *G01R 33/38* (2013.01); *G01R 33/3852* (2013.01); *H02M 3/33573* (2021.05); *H02M 1/0009* (2021.05); *H02M 3/335* (2013.01)

(58) Field of Classification Search
CPC .. G01R 33/38; G01R 33/2852; H02M 11/011; H02M 3/335; H02M 3/3573; H02M 1/0009
See application file for complete search history.

(56) References Cited

U.S. PATENT DOCUMENTS

| | | | |
|---|---|---|---|
| 7,656,141 B1* | 2/2010 | Granat | ................. H02M 3/158 |
| | | | 323/284 |
| 9,729,057 B1 | 8/2017 | Goenawan | |
| 2004/0183715 A1* | 9/2004 | Arlow | .................... G01S 7/282 |
| | | | 342/82 |

FOREIGN PATENT DOCUMENTS

| | | |
|---|---|---|
| CN | 201750340 U | 2/2011 |
| WO | 2016019788 A1 | 2/2016 |

* cited by examiner

*Primary Examiner* — Gary L Laxton (57) ABSTRACT

The present invention relates to a magnetic resonance system and a power supply device for a pulsed load of a magnetic resonance system. Embodiments of the present invention disclose a power supply device for a pulsed load of a magnetic resonance system. The power supply device includes: a switching power supply module, which is used to supply power to a pulsed load; a current measurement module, which is used to generate a pulse measurement signal on the basis of measuring the current of the pulsed load; a signal conversion module, which is used to convert the pulse measurement signal into a narrow pulse signal; and a drive controller, an input end of the drive controller being used to receive the narrow pulse signal, and the drive controller being used to drive the switching power supply module on the basis of the received narrow pulse signal.

11 Claims, 10 Drawing Sheets

MAGNETIC RESONANCE SYSTEM AND POWER SUPPLY DEVICE FOR PULSED LOAD OF MAGNETIC RESONANCE SYSTEM

CROSS REFERENCE

The present application claims priority and benefit of Chinese Patent Application No. 202211052977.9 filed on Aug. 31, 2022, which is incorporated herein by reference in its entirety.

TECHNICAL FIELD

Embodiments of the present invention generally relate to load power-supply technology, and relate in particular to a magnetic resonance (MR) system and a power supply device for a pulsed load of an MR system.

BACKGROUND

In an MR system, when power is supplied to a pulsed load of relatively large power, a high-capacitance capacitor assembly is used to perform smoothing filtering on a voltage outputted by a rectifying power supply, so as to provide a stable pulsating voltage to the load. Typically, pulsed loads, such as a radio frequency (RF) power amplifier, a gradient amplifier, and the like, in an MR system are of relatively large power, and a power supply system needs to respond quickly to a rising edge and a falling edge thereof and the like, so as to ensure the relevant performance of the MR system. In order to meet requirements for rapid response, a capacitor module having sufficient capacitance is required, otherwise power supply requirements when rapidly switching power of a pulsed load cannot be promptly responded to. However, in order to increase the capacitance of the capacitor module, at least one among the volume, number, and cost of the capacitor module needs to be increased, thereby affecting the design of the MR system in one or more aspects.

SUMMARY

According to an aspect of the present invention, provided is a power supply device for a pulsed load of an MR system, comprising:
  a switching power supply module, which is used to supply power to a pulsed load;
  a current measurement module, which is used to generate a pulse measurement signal on the basis of measuring the current of the pulsed load;
  a signal conversion module, which is used to convert the pulse measurement signal into a narrow pulse signal; and
  a drive controller, an input end of the drive controller being used to receive the narrow pulse signal, and the drive controller being used to drive the switching power supply module on the basis of the received narrow pulse signal.

According to another aspect of the present invention, provided is an MR system, comprising a pulsed load and the power supply device of the aspect above.

BRIEF DESCRIPTION OF THE DRAWINGS

The described and other features, aspects, and advantages of the present invention will be better understood once the following detailed description has been read with reference to the accompanying drawings. In the accompanying drawings, the same reference signs are used to represent the same components throughout the accompanying drawings, in which.

DETAILED DESCRIPTION

Specific embodiments of the present invention will be described in detail below with reference to the accompanying drawings in order to assist those skilled in the art to understand exactly the subject matter set forth in the present invention. In the following detailed description of the following specific embodiments, the present specification does not describe in detail any of the known functions or configurations to prevent unnecessary details from affecting the disclosure of the present invention.

Unless otherwise defined, the technical or scientific terms used in the claims and the description should be as they are usually understood by those possessing ordinary skill in the technical field to which they belong. Terms such as "first", "second" and similar terms used in the present description and claims do not denote any order, quantity or importance, but are only intended to distinguish different constituents. The terms "one" or "a/an" and similar terms do not express a limitation of quantity, but rather that at least one is present. The terms "include" or "comprise" and similar words indicate that an element or article preceding the terms "include" or "comprise" encompasses elements or articles and equivalent elements thereof listed after the terms "include" or "comprise," and does not exclude other elements or articles. The terms "connect" or "link" and similar words are not limited to physical or mechanical connections, and are not limited to direct or indirect connections. Furthermore, it should be understood that references to "an embodiment" or "embodiments" of the present disclosure are not intended to be construed as excluding the existence of additional implementations that also incorporate the referenced features.

The "module" described herein may be implemented by using software, hardware, or a combination of software and hardware. For example, in accordance with some aspects of the embodiments of the present invention, the "module"

described herein may be implemented as a computer program module or a circuit module.

Figure 1:
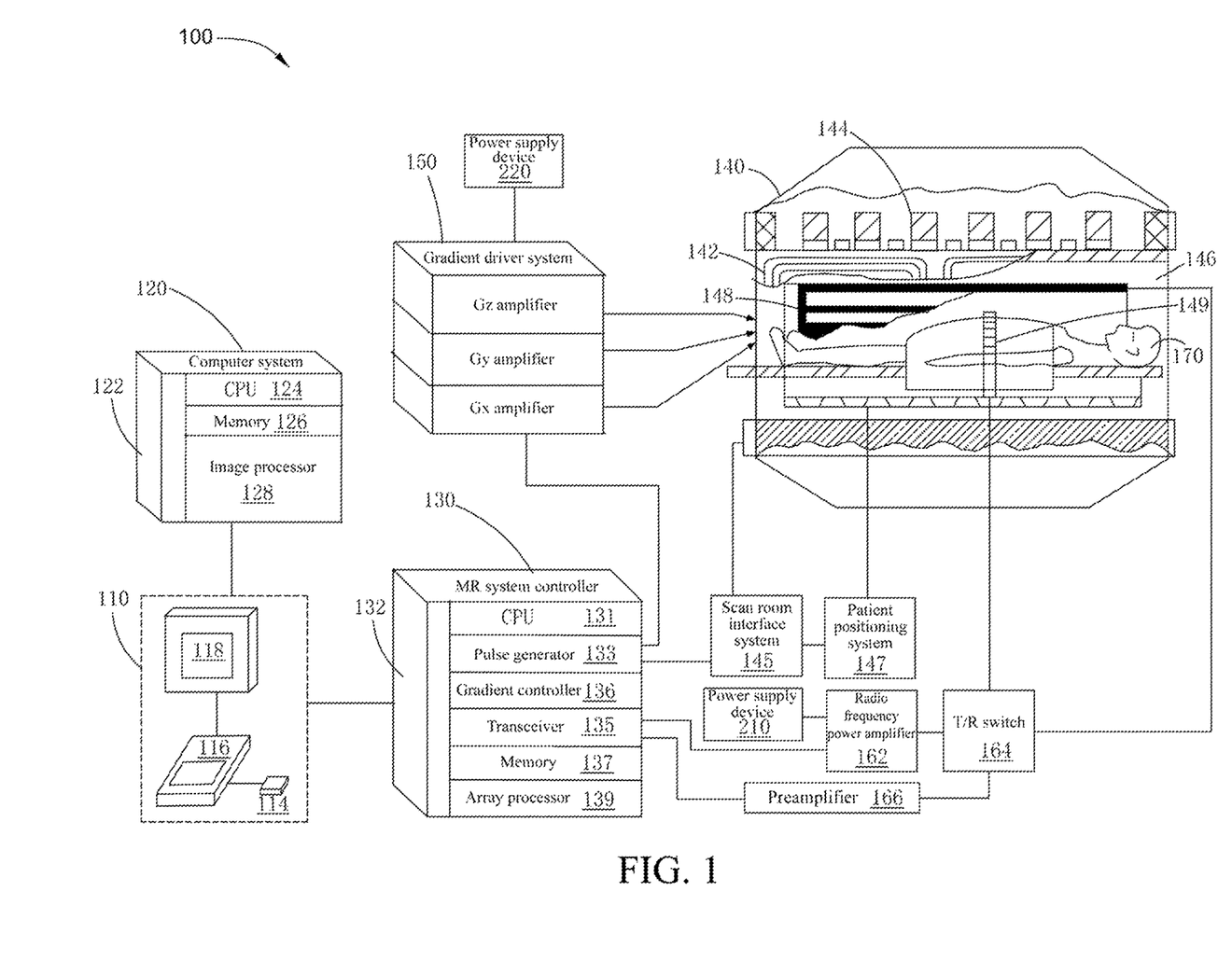
FIG. 1 illustrates a schematic diagram of an exemplary MR system 100 according to some embodiments of the present invention.

Referring to FIG. 1, FIG. 1 illustrates a schematic diagram of an exemplary magnetic resonance (MR) system 100 according to some embodiments of the present invention. An operator workstation 110 is used to control the operation of the MR system 100, the operator workstation 110 including an input apparatus 114, a control panel 116, and a display 118. The input apparatus 114 may be a joystick, a keyboard, a mouse, a trackball, a touch-activated screen, voice control, or any similar or equivalent input apparatus. The control panel 116 may include a keyboard, a touch-activated screen, voice control, a button, a slider, or any similar or equivalent control apparatus. The operator workstation 110 is coupled to and communicates with a computer system 120, and provides an interface to allow an operator to plan an MR scan, display an image, perform image processing, and store data and images.

The computer system 120 includes a plurality of modules that communicate with one another by means of an electrical and/or data connection module 122. The connection module 122 may be a wired communication link, an optical fiber communication link, a wireless communication link, and the like. The computer system 120 may include a central processing unit (CPU) 124, a memory 126, and an image processor 128. In some embodiments, the image processor 128 may be replaced with image processing functions run in the CPU 124. The computer system 120 may be connected to an archive media apparatus, a persistent or backup memory, or a network. The computer system 120 may be coupled to and communicate with a separate MR system controller 130.

The MR system controller 130 includes a set of modules that communicate with one another by means of an electrical and/or data connection module 132. The connection module 132 may be a direct wired communication link, an optical fiber communication link, a wireless communication link, and the like. In an alternative embodiment, modules of the computer system 120 and the MR system controller 130 may be implemented on the same computer system or on a plurality of computer systems. The MR system controller 130 may include a CPU 131, a sequence pulse generator 133 that communicates with the operator workstation 110, a transceiver (or an RF transceiver) 135, a gradient controller 136, a memory 137, and an array processor 139.

A subject 170 of the MR scan may be positioned within a cylindrical imaging volume 146 of a resonance assembly 140. The resonance assembly 140 includes a superconducting magnet having a superconducting coil 144, a radio frequency coil assembly, and a gradient coil assembly 142. The superconducting coil 144 provides, during operation, a static uniform longitudinal magnetic field $B_0$ throughout the cylindrical imaging volume 146. The radio frequency coil assembly may include a body coil 148 and a surface coil 149, and may be used to send and/or receive a radio frequency signal.

The MR system controller 130 may receive a command from the operator workstation 110 to indicate an MRI scan sequence that is to be executed during an MRI scan. The "scan sequence" above refers to a combination of pulses that have specific intensities, shapes, time sequences, and the like and that are applied when an MRI scan is executed. The pulses may typically include, for example, a radio frequency pulse and a gradient pulse. A plurality of scan sequences may be prestored in the computer system 120, so that a sequence suitable for clinical examination requirements can be indicated by means of the operator workstation. The clinical examination requirements may include, for example, an imaging site, an imaging function, an imaging effect, and the like. The sequence pulse generator 133 of the MR system controller 130 sends, on the basis of the indicated sequence, an instruction describing the time sequences, intensities, and shapes of the radio frequency pulse and gradient pulse in the sequence so as to operate a system component that executes the sequence.

A radio frequency pulse in a scan sequence sent by the sequence pulse generator 133 may be generated by means of the transceiver 135. The radio frequency pulse is amplified by a radio frequency power amplifier 162 and is provided to the body coil 148 by means of a transmit/receive switch (T/R switch) 164, and the RF body coil 148 then provides a transverse magnetic field $B_1$. The transverse magnetic field $B_1$ is substantially perpendicular to $B_0$ throughout the cylindrical imaging volume 146. The transverse magnetic field $B_1$ is used to excite stimulated nuclei in the body of a scan subject so as to generate MR signals.

A gradient pulse in the scan sequence sent by the sequence pulse generator 133 may be generated by means of the gradient controller 136 and acts on a gradient driver 150. The gradient driver 150 includes $G_x$, $G_y$, and $G_z$ amplifiers, and the like. Each of the $G_x$, $G_y$, and $G_z$ gradient amplifiers is used to excite a corresponding gradient coil in the gradient coil assembly 142, so as to generate a magnetic field gradient used to spatially encode the MR signals during the MR scan.

The sequence pulse generator 133 is coupled to and communicates with a scan room interface system 145, and the scan room interface system 145 receives signals from various sensors associated with the state of the resonance assembly 140 and various processors provided in a scan room. The scan room interface system 145 is further coupled to and communicates with a patient positioning system 147 that sends and receives signals to control the movement of a patient table to a desired position to perform the MR scan.

As described above, the RF body coil 148 and the RF surface coil 149 may be used to transmit a radio frequency pulse and/or receive MR signals from the scan subject. The MR signals emitted by excited nuclei in the body of the scan subject may be sensed and received by the RF body coil 148 or the RF surface coil 149 and then sent back to a preamplifier 166 by means of the T/R switch 164. The T/R switch 164 may be controlled by a signal from the MR system controller 130 to electrically connect, during a transmit mode, the radio frequency power amplifier 162 to the RF body coil 148 and to connect, during a receive mode, the preamplifier 166 to the RF body coil 148. The T/R switch 164 may further enable the RF surface coil 149 to be used in the transmit mode or the receive mode.

In some embodiments, the MR signals sensed and received by the RF body coil 148 or the RF surface coil 149 and amplified by the preamplifier 166 are demodulated, filtered, and digitized in a receiving portion of the transceiver 135, and transmitted as a raw k-space data array to the memory 137 in the MR system controller 130.

Figure 2:
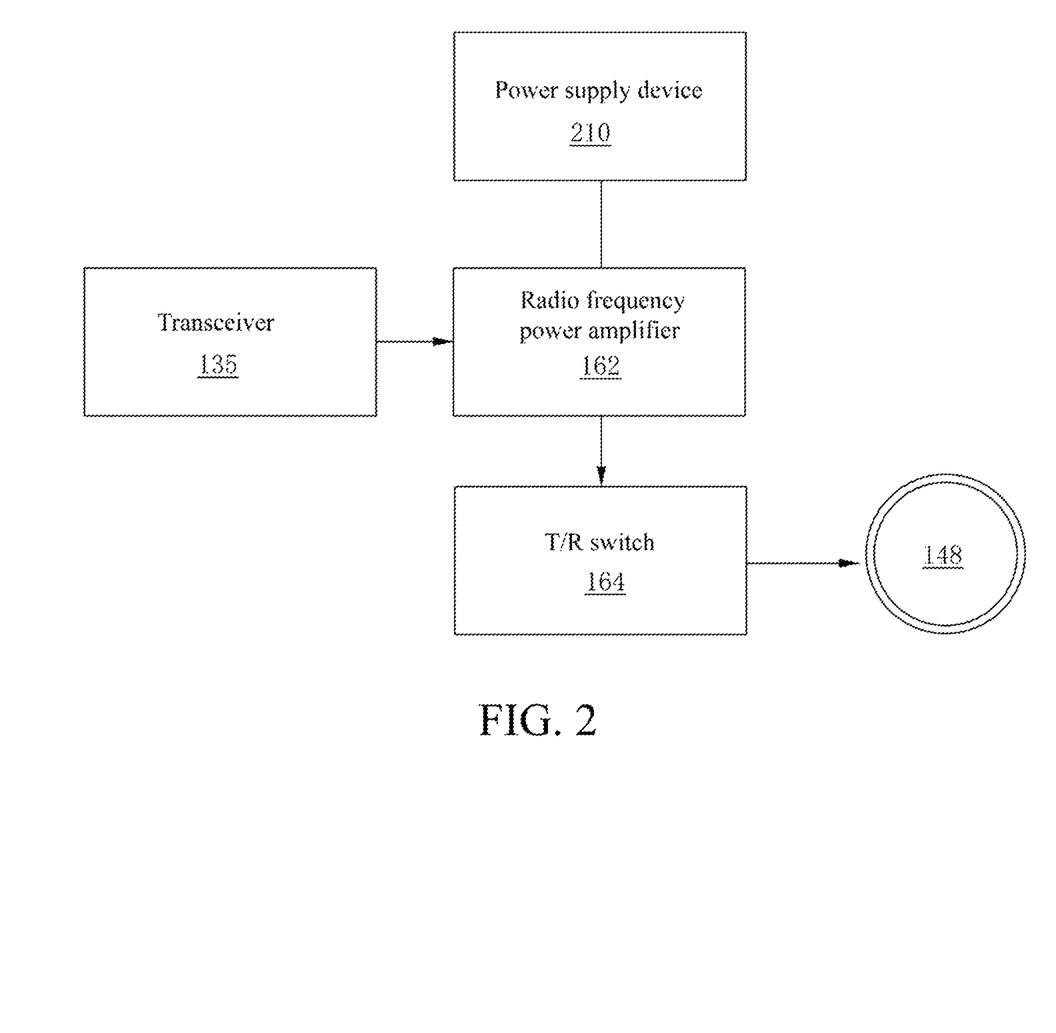
FIG. 2 illustrates an example of a radio frequency transmission link of the MR system 100.

As a non-limiting example, a transmission portion in the transceiver 135, the radio frequency power amplifier 162, and the T/R switch 164 shown in FIG. 1 constitute at least a portion of a radio frequency transmission link, and FIG. 2 is an example of the radio frequency transmission link. Furthermore, the receiving portion in the transceiver 135, the preamplifier 166, the switch 164, and the like shown in FIG. 1 constitute at least a portion of a radio frequency reception link. The radio frequency power amplifier 162 and the gradient driver 150 act as pulsed loads and are respectively powered by power supply devices 210 and 220. The power supply devices 210 and 220 may be subjected to power distribution by means of the same power distribution unit (PDU), and provide a required power supply to the corresponding pulsed loads. The power supply devices 210 and 220 may each include any one among power supply devices 300, 400, 500, and 600 described below.

A reconstructed magnetic resonance image may be obtained by transforming/processing stored raw k-space data. For each image to be reconstructed, the data is rearranged into separate k-space data arrays, and each of said separate k-space data arrays is inputted to the array processor 139, the array processor being operated to transform the data into an array of image data by means of Fourier transform.

The array processor 139 uses transform methods, most commonly Fourier transform, to create images from the received MR signals. The aforementioned images are transmitted to the computer system 120 and stored in the memory 126. In response to commands received from the operator workstation 110, the image data may be stored in a long-term memory, or may be further processed by the image processor 128 and transmitted to the operator workstation 110 for presentation on the display 118.

In various embodiments, components of the computer system 120 and MR system controller 130 may be implemented on the same computer system or on a plurality of computer systems. It should be understood that the MR system 100 shown in FIG. 1 is intended for illustration. Suitable MR systems may include more, fewer, and/or different components.

The MR system controller 130 and the image processor 128 may separately or collectively include a computer processor and a storage medium. The storage medium records a program for predetermined data processing and that is to be executed by the computer processor. For example, the storage medium may store a program used to implement scanning processing (such as a scan flow and an imaging sequence), image reconstruction, image processing, and the like. The described storage medium may include, for example, a ROM, a floppy disk, a hard disk, an optical disk, a magneto-optical disk, a CD-ROM, or a non-volatile memory card.

Figure 3:
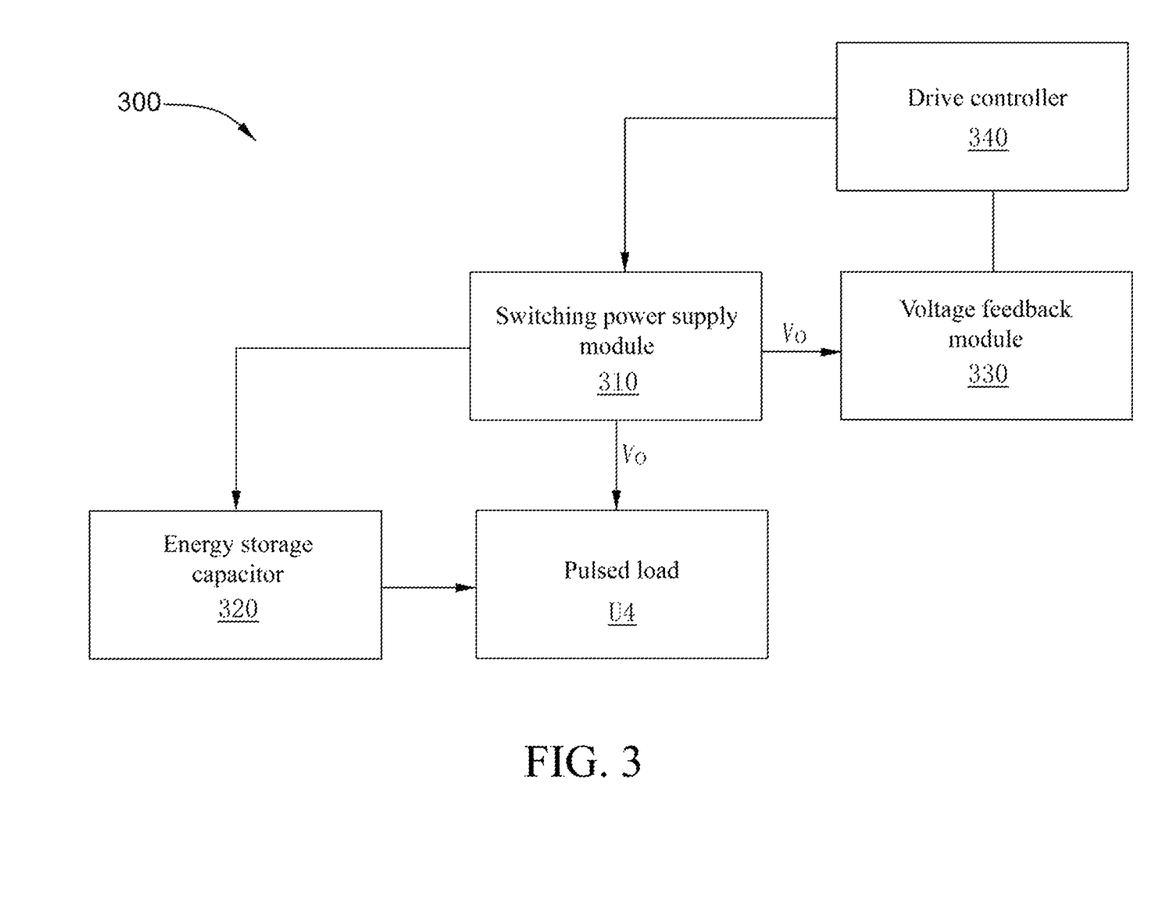
FIG. 3 illustrates a power supply device 300 for a pulsed load of an MR system according to an embodiment.

FIG. 3 illustrates a power supply device 300 for a pulsed load of a MR system according to an embodiment. An example of the MR system may be as illustrated in FIG. 1, and a pulsed load U4 therein may include a radio frequency power amplifier or a gradient amplifier.

As illustrated in FIG. 3, the power supply device 300 includes a switching power supply module 310, an energy storage capacitor 320, a voltage feedback module 330, and a drive controller 340. The switching power supply module 310 is used to supply power to the pulsed load U4. Specifically, the switching power supply module 310 is used to provide, to the pulsed load U4, a direct-current voltage Vo outputted under the control of the drive controller 340. The value of the direct-current voltage Vo may be determined on the basis of rated power or rated voltage of the pulsed load U4. The voltage feedback module 330 is used to receive the direct-current voltage Vo outputted by the switching power supply module 310, convert the same into a voltage feedback signal, and send the voltage feedback signal to the drive controller 340. The drive controller 340 may then generate a responding control signal on the basis of the voltage feedback, so as to control the operation of the switching power supply module 310, so that the switching power supply module 310 outputs a stable direct-current voltage Vo.

The energy storage capacitor 320 may be a high-capacitance capacitor that consists of a plurality of capacitors, and is connected in parallel to the pulsed load U4 and between two ends of the switching power supply module 310. The switching power supply module 310 is used to charge the energy storage capacitor 320. Specifically, when the power of the pulsed load U4 is 0 or close to 0, the switching power supply module 310 charges the energy storage capacitor 320, and when a pulsed direct-current voltage provided by the switching power supply module 310 decreases (for example, is less than a rated operating voltage of the pulsed load U4), power is quickly supplied to the pulsed load U4 by means of the energy storage capacitor, so as to quickly respond to power switching of the pulsed load U4.

The capacitance of the energy storage capacitor 320 needs to be large enough to be able to quickly respond to power supply requirements at the moment of power switching of the pulsed load, so that the operating voltage of the pulsed load U4 is stable in a power increase time period.

Figure 4:
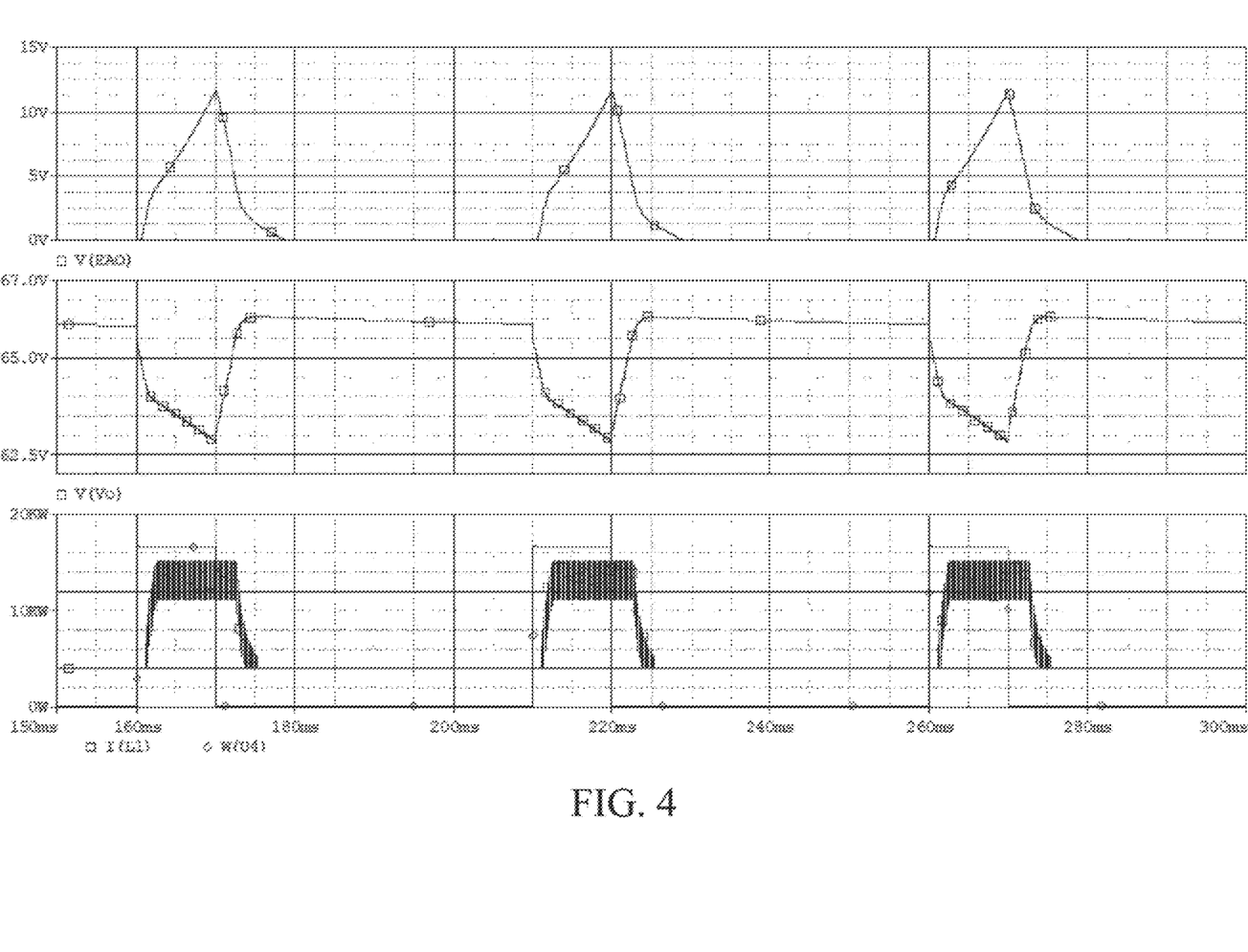
FIG. 4 illustrates a load response situation when an energy storage capacitor having relatively low capacitance is used.

FIG. 4 illustrates a load response situation when an energy storage capacitor having relatively low capacitance is used. As illustrated in FIG. 4, when the power W (U4) of the pulsed load U4 increases rapidly from 0 to 16 kilowatt (kW), the voltage feedback signal V (EAO) increases gradually from 0. A rising edge of an inductive current I (L1) of the switching power supply module 310 is delayed by 1.1 milliseconds relative to a rising edge of the power W (U4) of the pulsed load U4. A relatively large decrease in the direct-current voltage V (Vo) occurs, possibly because the capacitance of the energy storage capacitor is not sufficient to quickly compensate for the consumed voltage.

Increasing the capacitance of the energy storage capacitor 320 is an effective solution; however, more capacitor units may be required, thereby increasing costs and volume.

Figure 5:
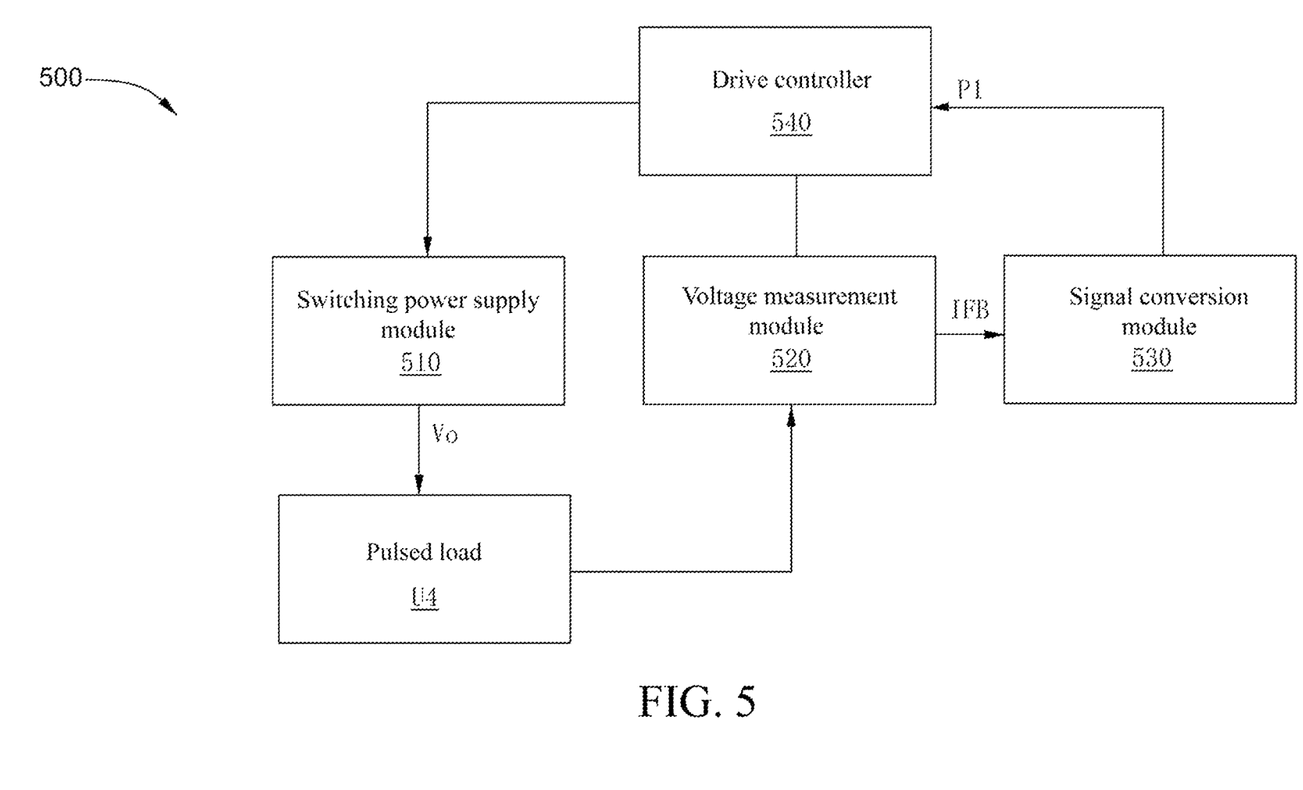
FIG. 5 illustrates a power supply device 500 for a pulsed load of an MR system according to an embodiment of the present invention.

FIG. 5 illustrates a power supply device 500 for a pulsed load of a MR system according to an embodiment of the present invention, wherein the load response speed is increased without increasing or by appropriately decreasing the capacitance of an existing energy storage capacitor. As illustrated in FIG. 5, the power supply device 500 includes a switching power supply module 510, a current measurement module 520, a signal conversion module 530, and a drive controller 540. The switching power supply module 510 is used to supply power to the pulsed load U4. The current measurement module 520 is used to generate a pulse measurement signal IFB on the basis of measuring the current of the pulsed load U4. The signal conversion module 530 is used to convert the pulse measurement signal IFB into a narrow pulse signal P1. An input end of the drive controller 540 is used to receive the narrow pulse signal P1, and the drive controller drives the switching power supply module 510 on the basis of the received narrow pulse signal P1. The current of the pulsed load U4 is measured, and a current measurement signal is converted into the narrow pulse signal P1, so that the current of the pulsed load can be promptly fed back. Whenever the current of the pulsed load increases, the drive controller 340 can quickly receive a narrow pulse signal, so that a drive control signal responding to the narrow pulse signal is generated, so as to control the operation of the switching power supply module 310 to provide a required voltage to the pulsed load U4.

Figure 6:
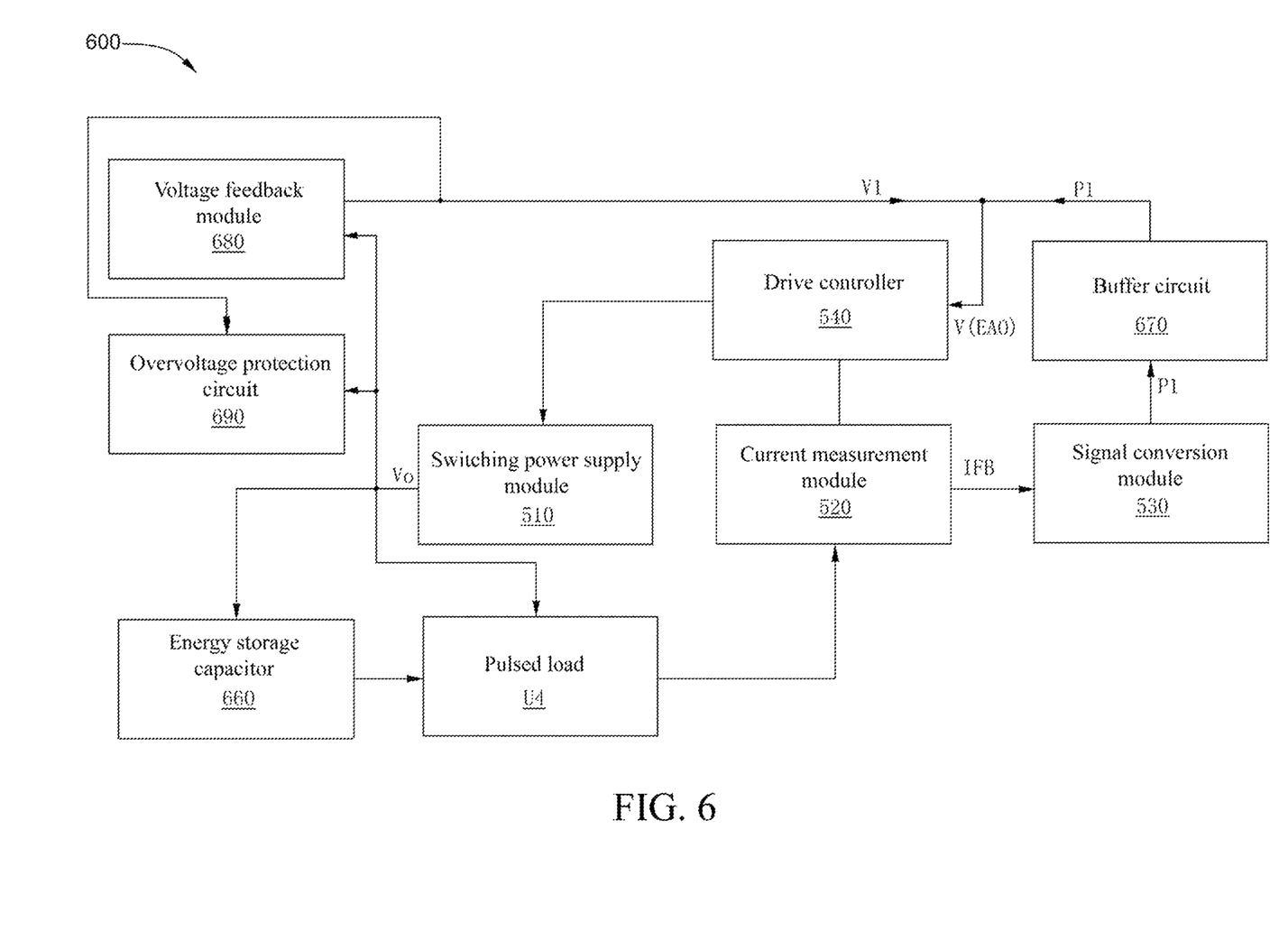
FIG. 6 illustrates a block diagram of a power supply device 600 for a pulsed load of an MR system according to an embodiment of the present invention.

FIG. 6 illustrates a block diagram of a power supply device 600 for a pulsed load of a MR system according to an embodiment of the present invention. The power supply device 600 further includes an energy storage capacitor 660 connected in parallel to an output end of the switching power supply module 510 so as to store electrical energy and supply power to the pulsed load U4. When the power of the pulsed load U4 decreases (for example, a power value after a falling edge and before the next rising edge), the switching power supply module 510 charges the energy storage capacitor 660, so that when the power of the pulsed load U4 increases (for example, a power value after a rising edge and before the next falling edge), the energy storage capacitor 660 provides a voltage to the pulsed load U4, so as to smooth an output voltage of the switching power supply module 510. Since the switching power supply module 510 has responded quickly to the power switching of the pulsed load U4, the capacitance of the energy storage capacitor 660 may be sufficiently small, so that providing a relatively small voltage change can smooth the output of the switching power supply module 510, thereby enabling the pulsed load to acquire a stable operating voltage at the moment of a rapid power increase.

A buffer circuit 670 is connected between the signal conversion module 530 and the drive controller 540, and is used to output the narrow pulse signal P1 generated by the signal conversion module 530 to the drive controller 540. In this way, the effect of the signal conversion module 530 on an input end of a circuit of a following stage thereof is eliminated.

The power supply device 600 further includes a voltage feedback circuit 680. An input end of the voltage feedback circuit 680 is connected to the output end of the switching power supply module 510, and an output end of the voltage feedback circuit 680 is connected to the input end of the drive controller 540. The voltage feedback circuit 680 outputs a first feedback voltage V1 to the drive controller 540 on the basis of measuring the output voltage Vo of the switching power supply module 510. Therefore, a feedback voltage V (EAO) received by the input end of the drive controller 540 is the sum of the first feedback voltage V1 and the narrow pulse signal P1, and the drive controller 540 can generate a suitable drive control signal on the basis of both the first feedback voltage V1 and the narrow pulse signal P1, so as to drive the switching power supply module 510 to provide suitable output voltage Vo.

In embodiments of the present invention, the output end of the voltage feedback circuit 680 is connected to an output end of the buffer circuit 670. The above input end of the drive controller 540 is connected to a connection node of the voltage feedback circuit 680 and buffer circuit 670, so that the first feedback voltage V1 and the narrow pulse signal P1 generated on the basis of measuring the output voltage Vo can be simultaneously received to perform drive control on the switching power supply module 510. In addition, the narrow pulse signal can reflect rapid power switching of the load pulse U4, so that while a drive signal is generated on the basis of the first feedback voltage V1, the drive signal can be adjusted quickly on the basis of the narrow pulse signal, so as to control the switching power supply module 510 to promptly provide a required voltage to the load pulse.

In embodiments of the present invention, an overvoltage protection circuit 690 is connected between the output end of the switching power supply module 510 and the output end of the voltage feedback circuit 680. The narrow pulse signal P1 may cause the voltage at the output end of the voltage feedback circuit 680 to increase continuously, and by means of the overvoltage protection circuit 690, circuit damage caused by an overly high voltage is avoided.

Figure 7:
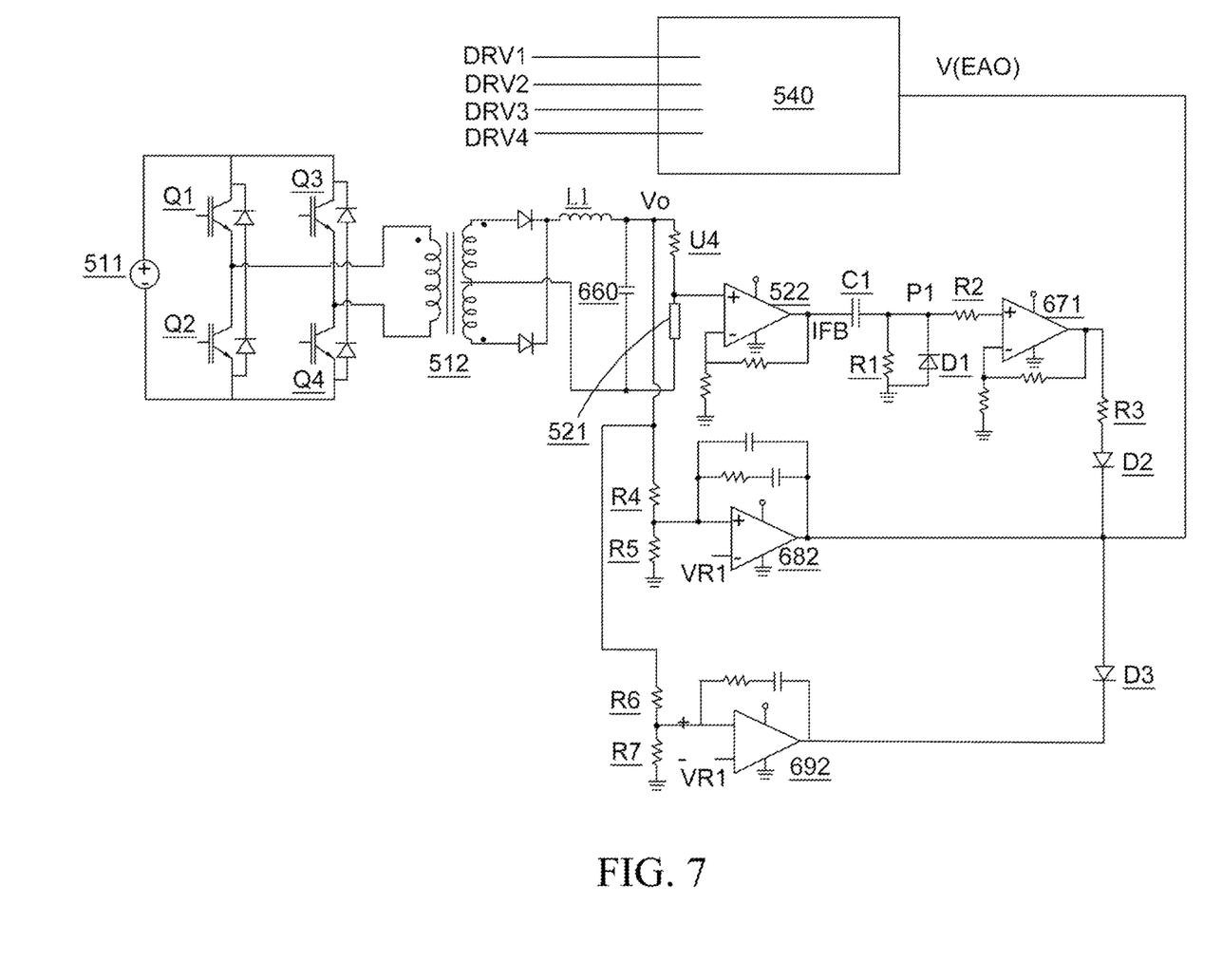
FIG. 7 illustrates an example of a circuit diagram of the power supply device 600.

FIG. 7 illustrates an example of a circuit diagram of the power supply device 600. Referring to FIG. 7, the switching power supply module 510 includes an input power supply 511, a full bridge circuit formed by connecting field-effect transistors Q1, Q2, Q3, and Q4, a transformer 512, and a filter inductor L1. An input end of the transformer 512 is respectively connected to two bridge arms of the full bridge circuit. An output end of the transformer 512 is used to output the voltage Vo. The drive controller 540 may be a pulse-width modulation (PWM) controller, and includes four drive ends DRV1, DRV2, DRV3, and DRV4 which are respectively connected to gates of the field-effect transistors Q1, Q2, Q3, and Q4. The drive controller 540 controls the on/off state of the field-effect transistors Q1, Q2, Q3, and Q4, so that the full bridge circuit outputs a voltage on the basis of voltage requirements of the pulsed load. In addition, the drive controller 540 may adjust a duty cycle of a pulse-width modulation waveform on the basis of the received narrow pulse signal P1, so as to adjust the output voltage of the switching power supply module 510.

Referring to FIG. 7, the current measurement module 520 includes a current sensor 521 and an amplifier 522. The current sensor 521 is connected in series to the pulsed load U4, and is then connected in parallel to the output end of the switching power supply module 510. When a current flowing through the pulsed load U4 passes through the current sensor 521, the size of the current currently flowing through the pulsed load U4 can be measured by measuring a voltage signal applied to the current sensor 521. A non-inverting end of the amplifier 522 is used to receive a voltage signal between the current sensor 521 and the pulsed load U4, so that the voltage signal is amplified, and the amplified voltage signal is outputted by means of an output end of the amplifier 522 to serve as the described pulse measurement signal IFB.

The signal conversion module 530 includes a differential circuit. Specifically, the differential circuit includes a capacitor C1 and a resistor R1. One end of the capacitor C1 is connected to the output end of the amplifier 522. The other end of the capacitor C1 is connected to one end of the resistor R1. The other end of the resistor R1 is grounded. At the moment when the pulse measurement signal IFB is on the rising edge or the falling edge, the absolute value of the voltage at a connection node of the resistor R1 and the capacitor C1 is relatively large. In a constant time period within which the pulse measurement signal is maintained at a relatively high level or a relatively low level, no current passes through the two ends of the resistor R1, so that the voltage at the connection node of the resistor R1 and the capacitor C1 is 0. Therefore, the IFB signal conversion module 530 may be used to convert the pulse measurement signal IFB presented as a rectangular wave into a narrow pulse wave (or a spike pulse wave) P1. The narrow pulse wave P1 may reflect only the pulse measurement signal IFB at a transient rise or a transient fall, so that transient power switching of the pulsed load can be promptly responded to.

In some embodiments, a protective diode D1 is connected in parallel to the two ends of the resistor R1. An anode of the protective diode D1 is grounded, and a cathode of the protective diode D1 is connected to the connection node of the capacitor C1 and the resistor R1.

The signal conversion module 530 may also employ another circuit that is capable of extracting rising edge or falling edge information of an input waveform.

In embodiments of the present invention, the buffer circuit 670 includes an amplifier 671. A non-inverting input end of the amplifier 671 is connected to the output end of the signal conversion module 530 by means of a resistor R2. The amplification factor of the amplifier 671 is 1, and the received narrow pulse signal P1 is outputted by means of an output end thereof.

The buffer circuit 670 further includes a resistor R3. One end of the resistor R3 is connected to the output end of the amplifier 671, and the other end acts as the output end of the buffer circuit 670.

Referring to FIG. 7, a diode D2 may be further connected between the buffer circuit 670 and the drive controller 540. An anode of the diode D2 is connected to the output end of the buffer circuit 670, and a cathode is connected to the input end of the drive controller 540. The diode D2 may be used to prevent a small pulse signal having a smaller amplitude than the above narrow pulse signal P1 from being transmitted to the drive controller 540, thereby preventing the drive controller 540 from adjusting the control of the switching power supply module 510 on the basis of the small pulse signal. The small pulse signal may be generated due to an undesirable sudden change in the voltage in a circuit.

The voltage feedback circuit 680 includes a first voltage dividing circuit and a comparator 682. The first voltage dividing circuit includes a resistor R4 and a resistor R5 connected in series to one another. The first voltage dividing circuit is used to receive the output voltage Vo of the switching power supply module 510, perform voltage division on the output voltage Vo, and then output a first divided voltage to an inverting input end of the comparator 682 by means of a connection node of the resistors R4 and R5. The comparator 682 compares the first divided voltage with a reference voltage VR1 inputted to a non-inverting input end thereof, and outputs the comparison result by means of an output end thereof to the input end of the drive controller 540. The output end of the comparator 682 acts as the output end of the voltage feedback circuit 680, and is further connected to the cathode of the diode D2.

The overvoltage protection circuit 690 includes a second voltage dividing circuit, a comparator 692, and a diode D3. A cathode of the diode D3 is connected to an output end of the comparator 692. An anode of the diode D3 is connected to the output end of the comparator 682. The second voltage dividing circuit includes a resistor R6 and a resistor R7 connected in series to one another. The second voltage dividing circuit is used to receive the output voltage Vo of the switching power supply module 510, perform voltage division on the output voltage Vo, and then output a second divided voltage to an inverting input end of the comparator 692 by means of a connection node of the resistors R6 and R7. The comparator 692 compares the second divided voltage with a reference voltage VR1 inputted to a non-inverting input end thereof, and outputs the comparison result by means of the output end thereof. When the narrow pulse signal P1 may cause the voltage at the output end of the comparator 682 to be overly high, the diode D3 is turned on to perform overvoltage protection.

In embodiments of the present invention, the pulsed load U4 may include a radio frequency power amplifier, and may also include a gradient amplifier.

Figure 8:
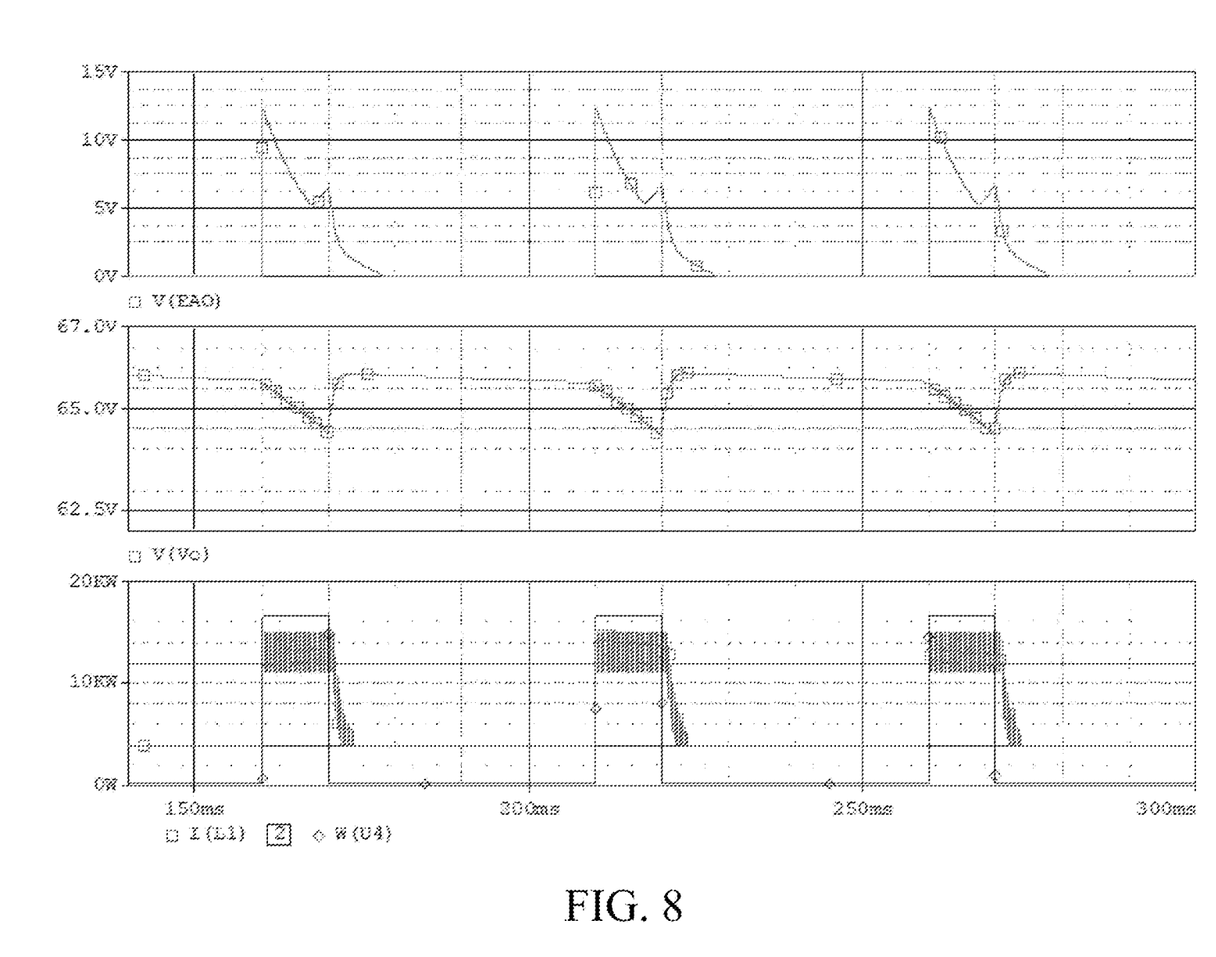
FIG. 8 shows a load response situation of using a power supply device of an embodiment of the present invention.

FIG. 8 shows a load response situation of using a power supply device of an embodiment of the present invention, and a pulsed load is identical to the relevant pulsed load in FIG. 4. As illustrated in FIG. 8, a feedback signal V (EOA) received by the drive controller 540 increases nearly at the same time as the rising edge of the power W (U4) of the pulsed load. The switching power supply module directly outputs power required by the pulsed load. The inductive current I (L1) on the filter inductor L1 reaches the maximum value nearly at the same time as the rising edge of the power of the pulsed load. The output voltage Vo decreases to the minimum value, i.e., 64.3 V, and the decrease is reduced compared to that in the prior art.

Figure 9:
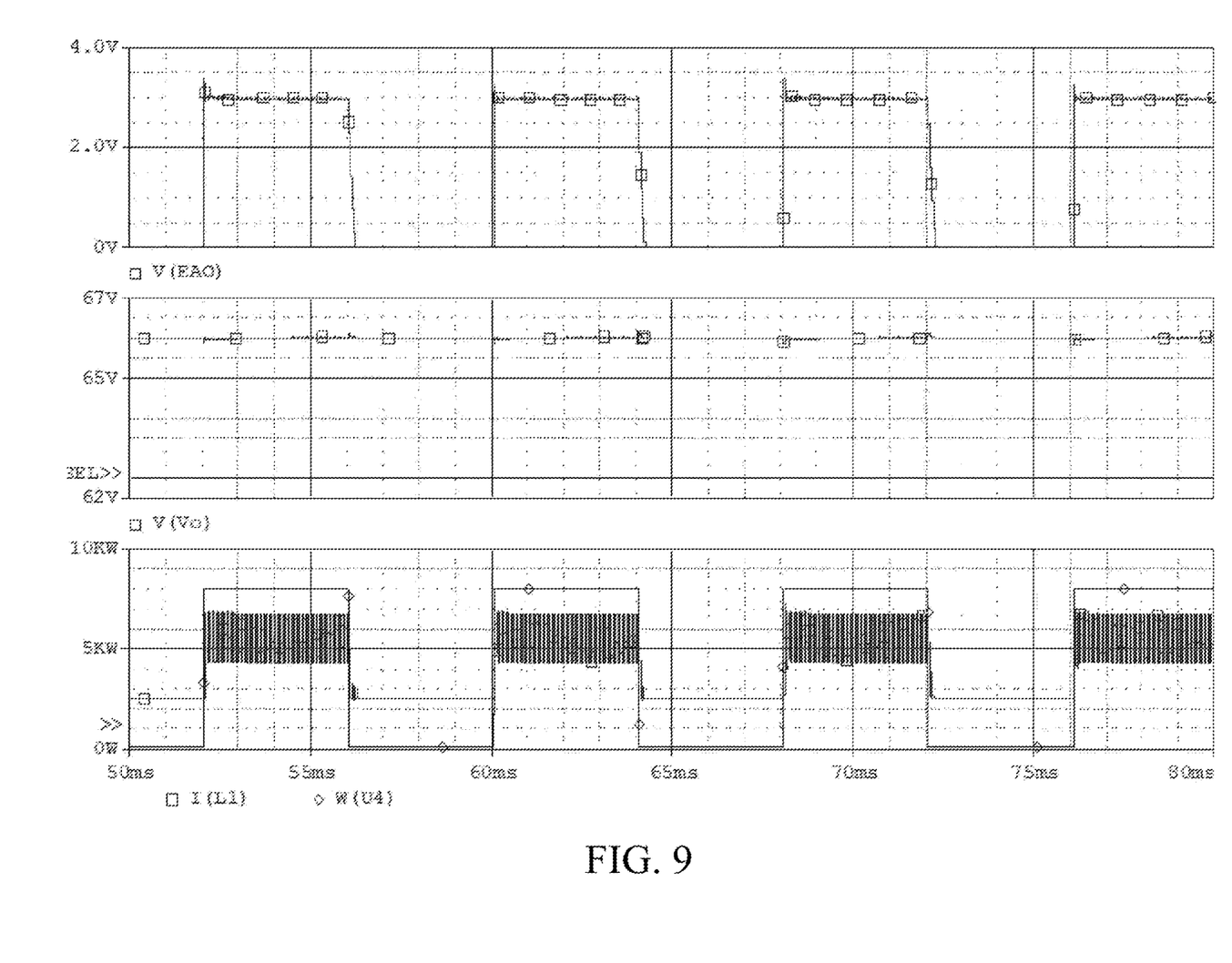
FIG. 9 shows another load response situation of using a power supply device of an embodiment of the present invention.

FIG. 9 shows another load response situation of using a power supply device of an embodiment of the present invention, and a pulsed load therein and the relevant pulsed load illustrated in FIG. 8 have different peak power and power switching rates. As illustrated in FIG. 9, a feedback signal V (EOA) received by the drive controller 540 increases nearly at the same time as the rising edge of the power of the pulsed load. The switching power supply module directly outputs the power required by the pulsed load. The inductive current I (L1) on the filter inductor L1 reaches the maximum value nearly at the same time as the rising edge of the power of the pulsed load. The output voltage Vo is maintained stably at 66 V. Compared to the prior art, a stable operating voltage is provided to the pulsed load.

Figure 10:
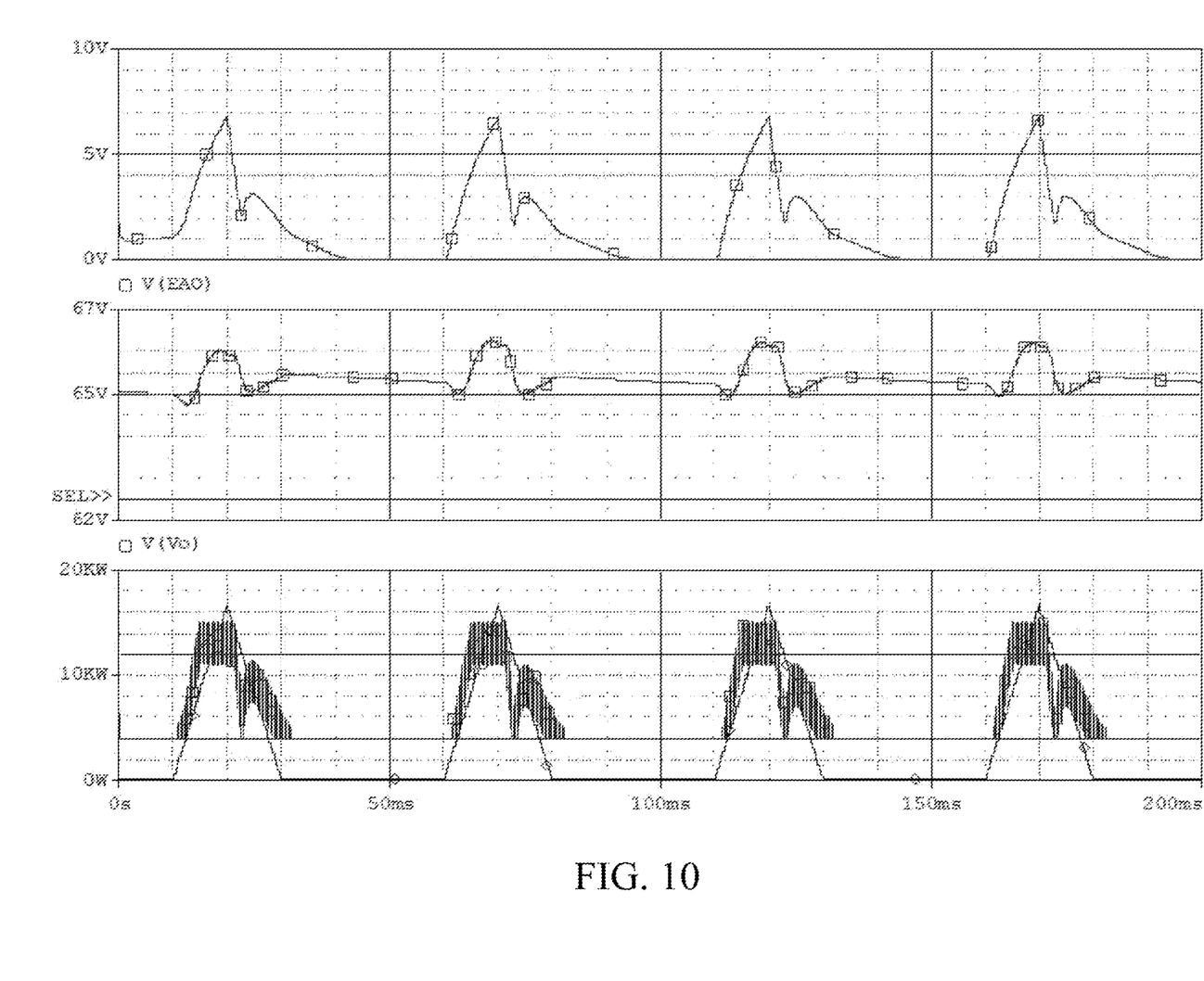
FIG. 10 shows another load response situation of using a power supply device of an embodiment of the present invention.

FIG. 10 shows another load response situation of using a power supply device of an embodiment of the present invention, and power of a pulsed load therein is presented as triangular waves. The pulsed load and the relevant pulsed loads illustrated in FIG. 8 and FIG. 9 have different peak power and power switching rates. As illustrated in FIG. 10, a feedback signal V (EOA) received by the drive controller 540 increases nearly at the same time as the rising edge of the power of the pulsed load. The switching power supply module directly outputs the power required by the pulsed load. Changes in the inductive current I (L1) on the filter inductor L1 are nearly synchronous with changes in the power of the pulsed load. The output voltage Vo fluctuates around 65 V, and the greatest fluctuation is only 1.2 V. Therefore, a stable operating voltage can be provided to the pulsed load.

In view of the above description, provided in embodiments of the present invention is a power supply device 500, 600 for a pulsed load of a MR system. The power supply device 500, 600 includes: a switching power supply module 510, which is used to supply power to a pulsed load U4; a current measurement module 520, which is used to generate a pulse measurement signal on the basis of measuring the current of the pulsed load U4; a signal conversion module 530, which is used to convert the pulse measurement signal into a narrow pulse signal; and a drive controller 540, an input end of the drive controller 540 being used to receive the narrow pulse signal, and the drive controller 540 being used to drive the switching power supply module 510 on the basis of the received narrow pulse signal.

The device 500, 600 may include an energy storage capacitor 660, which is connected in parallel to an output end of the switching power supply module 510 so as to store electrical energy and supply power to the pulsed load U4.

The current measurement module 520 includes: a current sensor 521, which is connected in series to the pulsed load U4, and then connected in parallel to the output end of the switching power supply module 510; and an amplifier 522, which is used to receive a voltage signal between the current sensor 521 and the pulsed load U4, and amplify the voltage signal to acquire the pulse measurement signal.

The signal conversion module 530 includes a differential circuit.

A buffer circuit 670 is connected between the signal conversion module 530 and the drive controller 540, and is used to output the narrow pulse signal generated by the signal conversion module 530 to the drive controller 540.

A diode D2 is further connected between the buffer circuit 670 and the drive controller 540. An anode of the diode D2 is connected to an output end of the buffer circuit 670, and a cathode of the diode is connected to the drive controller 540.

The device 500, 600 may further include a voltage feedback circuit 680. An input end of the voltage feedback circuit 680 is connected to the output end of the switching power supply module 510, and an output end of the voltage feedback circuit 680 is connected to the input end of the drive controller 540. The voltage feedback circuit 680 outputs a feedback voltage to the drive controller 540 on the basis of measuring an output voltage of the switching power supply module 510.

The device 500, 600 may further include an overvoltage protection circuit 690. The overvoltage protection circuit 690 includes: a comparator 692, an input end of the comparator 692 being used to receive a second divided voltage of the output voltage of the switching power supply module 510, and the comparator 692 being used to compare a first divided voltage with a preset reference voltage, and output the comparison result by means of an output end thereof. The overvoltage protection circuit further includes a diode D3. A cathode of the diode D3 is connected to the output end of the comparator 692, and an anode is connected to the output end of the voltage feedback circuit 680.

Also provided in embodiments of the present invention is a MR system, including a pulsed load and the power supply device according to any embodiment described above.

While the present invention has been described in detail with reference to specific embodiments, it would be understood by those skilled in the art that many modifications and variations can be made to the present invention. Therefore, it should be understood that the claims are intended to cover all such modifications and variations within the true spirit and scope of the present invention.

The invention claimed is:

1. A power supply device for a pulsed load of a magnetic resonance system, comprising:
    a switching power supply module used to supply power to a pulsed load;
    a current measurement module used to generate a pulse measurement signal on the basis of measuring the current of the pulsed load;
    a signal conversion module used to convert the pulse measurement signal into a narrow pulse signal; and
    a drive controller, an input end of the drive controller being used to receive the narrow pulse signal, and the drive controller being used to drive the switching power supply module on the basis of the received narrow pulse signal.

2. The device according to claim 1, further comprising:
    an energy storage capacitor connected in parallel to an output end of the switching power supply module, so as to store electrical energy and supply power to the pulsed load.

3. The device according to claim 1, wherein the current measurement module comprises:
    a current sensor connected in series to the pulsed load, and then connected in parallel to an output end of the switching power supply module; and
    an amplifier used to receive a voltage signal between the current sensor and the pulsed load, and amplify the voltage signal to acquire the pulse measurement signal.

4. The device according to claim 1, wherein the signal conversion module comprises a differential circuit.

5. The device according to claim 1, wherein a buffer circuit is connected between the signal conversion module and the drive controller, and is used to output the narrow pulse signal generated by the signal conversion module to the drive controller.

6. The device according to claim 5, wherein a diode is further connected between the buffer circuit and the drive controller, an anode of the diode being connected to an output end of the buffer circuit, and a cathode of the diode being connected to the drive controller.

7. The device according to claim 1, further comprising a voltage feedback circuit, an input end of the voltage feedback circuit being connected to an output end of the switching power supply module, an output end of the voltage feedback circuit being connected to the input end of the drive controller, and the voltage feedback circuit outputting a feedback voltage to the drive controller on the basis of measuring an output voltage of the switching power supply module.

8. The device according to claim 7, further comprising an overvoltage protection circuit, the overvoltage protection circuit comprising:
    a comparator an input end of the comparator being used to receive a first divided voltage of the output voltage of the switching power supply module, and the comparator being used to compare the first divided voltage with a preset reference voltage, and to output the result of the comparison by means of an output end thereof; and
    a diode, a cathode of the diode being connected to the output end of the comparator, and an anode being connected to the output end of the voltage feedback circuit.

9. The device according to claim 1, wherein the pulsed load comprises a radio frequency power amplifier of the magnetic resonance system.

10. The device according to claim 1, wherein the pulsed load comprises a gradient amplifier of the magnetic resonance system.

11. A magnetic resonance system, comprising a pulsed load and the power supply device for a pulsed load of a magnetic resonance system according to claim 1.

* * * * *